United States Patent [19]
Merrill, Jr. et al.

[11] 3,857,731

[45] Dec. 31, 1974

[54] ACRYLATE MICROSPHERE-SURFACED SHEET MATERIAL

[75] Inventors: Roger F. Merrill, Jr., Troy Township, Saint Croix County, Wis.; Henry R. Courtney, St. Paul, Minn.

[73] Assignee: Minnesota Mining and Manufacturing Company, St. Paul, Mich.

[22] Filed: Apr. 6, 1973

[21] Appl. No.: 348,604

[52] U.S. Cl............... 117/122 PA, 117/122 PF, 161/DIG. 5, 260/33.8 UB, 260/78.5 R
[51] Int. Cl............................................ A61l 15/06
[58] Field of Search............ 260/33.8 UB, 78.5 R; 117/36.1, 122 P, 122 PA, 122 PF, 33, 68.5; 161/167, DIG. 5, 406

[56] References Cited
UNITED STATES PATENTS

| | | | |
|---|---|---|---|
| 3,511,788 | 5/1970 | Keil | 117/36.1 X |
| 3,531,312 | 9/1970 | Newman | 117/36.1 X |
| 3,578,622 | 5/1971 | Brown et al. | 260/33.8 UB |
| 3,690,924 | 9/1972 | Estes | 117/122 PF |
| 3,691,140 | 9/1972 | Silver | 260/78.5 R |
| 3,740,366 | 6/1973 | Sanderson et al. | 117/122 PF |
| 3,741,786 | 6/1973 | Torrey | 117/122 P X |

Primary Examiner—Thomas J. Herbert, Jr.
Attorney, Agent, or Firm—Alexander, Sell, Steldt & DeLaHunt

[57] ABSTRACT

A pressure-sensitive sheet construction having particular utility as a durable, reusable bulletin board surface, comprises a substrate bonded to at least one surface thereof a binder material; partially embedded in the exposed surface of the binder and protruding therefrom are inherently tacky elastomeric copolymer microspheres.

9 Claims, 3 Drawing Figures

ACRYLATE MICROSPHERE-SURFACED SHEET MATERIAL

BACKGROUND OF THE INVENTION

This invention relates to pressure-sensitive sheet constructions. More particularly, it relates to pressure-sensitive sheet constructions containing an adhesive system which permits repeated cycles in which materials are alternatively bonded thereto and removed therefrom.

Conventional adhesives for adhering paper and other like materials to substrates, while having many desirable features, also have inherent drawbacks. For example, while some such adhesives may permit removal of paper from a substrate to which it has been adhered, they do not permit rebonding of the paper to the substrate. Conversely, other adhesives possess a tack which may be so aggressive as to cause the paper to tear on removal.

Recently, an adhesive comprising inherently tacky elastomeric acrylate copolymer in microspherical form was disclosed and claimed in commonly assigned U.S. Pat. No. 3,691,140, granted to Silver on Sept. 12, 1972. As taught by the patent, these copolymer microspheres disperse in various solvents to form suspensions which can be utilized in aerosol spray applications. When a substrate is sprayed with such suspensions and the solvent thereafter evaporated, there results a discontinuous coating of mildly tacky pressure-sensitive adhesive. Paper and the like can be applied to the surface of the coating, removed, repositioned, and rebonded.

It has been found, however, that during removal of an adhered object, some of the particulate adhesive spheres will transfer to the surface of the object, reducing the number of spheres on the originally coated substrate. Therefore, a substrate having the adhesive sprayed thereon soon loses its tacky nature, and after repeated applications and removals, subsequent objects will eventually not adhere thereto. In certain constructions, e.g., as an adhesive-coated bulletin board, this feature of adhesive transfer on removal of an adhered object is detrimental. A bulletin board, to be successful, necessarily requires a minimal amount of reduction in surface tack during normal use. Over the useful life of the bulletin board, many objects such as paper will necessarily be adhered to the board surface and subsequently removed therefrom.

Thus there has never been a product which can be used as an adhesive-surfaced bulletin board and present a tacky surface which objects can be repeatedly adhered to and removed from.

SUMMARY OF THE INVENTION

It has been found that by providing individual sockets on a substrate surface for the microspherical adhesive to be retained in, transfer of the adhesive on removal of an object adhered thereto, is substantially reduced. This individual socket can conveniently be provided by a binder material bonded to the substrate surface. Surprisingly, it has been found that the binder need not have a high degree of adhesion for the microspheres, and in fact binders having an extremely low adhesion for the microspheres, provide an excellent microsphere-retaining surface, apparently because the anchoring of the microspheres is predominantly by mechanical forces.

In accordance with the invention, there is provided a composite sheet construction comprising a substrate to at least one surface of which is bonded a binder material having embedded therein and protruding from the exposed surface thereof, elastomeric, inherently tacky, acrylate copolymer microspheres of the Silver type. These microspheres consist essentially of about 90 to 99.5 percent by weight of at least one alkyl acrylate ester and about 10 to about 0.5 weight percent of at least one monomer selected from the group consisting of substantially oil-insoluble, water-soluble, ionic monomers and maleic anhydride.

Through utilization of a binder material, a microsphere-retaining surface is presented. This effectively prevents removal or transfer of the pressure-sensitive adhesive microspheres when an adhered object is removed from the adhesive surface, and the surface is repeatedly reusable.

DETAILED DESCRIPTION OF THE INVENTION

Figure 1:
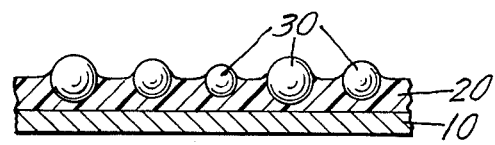

The tacky microspheres useful in the invention are those produced as disclosed in the aforementioned U.S. Pat. No. 3,691,140, incorporated herein by reference. Preferably, the microspheres contain about 95 to 99 weight percent acrylate monomer and about 5 to 1 weight percent ionic monomer, maleic anhydride, or a mixture thereof.

The normally tacky and elastomeric copolymer spheres are small in size, having diameters in the range of about 1 to 250 microns, with the majority of the spheres falling in the diameter range of about 5 to about 150 microns.

The acrylate ester portion of the microspheres consist of those monomers which are oleophilic, water-emulsifiable, substantially water-insoluble, and which, as homopolymers, generally have glass transition temperatures below about 20°C. Exemplary monomers are iso-octyl acrylate, 4-methyl-2-pentyl acrylate, 2-methyl butyl acrylate, and sec-butyl acrylate.

The ionic monomer portion of the microspheres consists of those monomers which are water-soluble and substantially oil-insoluble, these terms as defined in the aforementioned U.S. Pat. No. 3,691,140. Exemplary monomers include trimethylamine methacrylamide, trimethylamine, p-vinyl benzimide, ammonium acrylate, sodium acrylate, N,N-dimethyl-N-1-(2-hydroxypropyl)amine methacrylimide, 4,4,9-trimethyl-4-azonia-7-oxo-8-oxa-9-decene-1-sulphonate, 1,1-dimethyl-1-(2,3-dihydroxypropyl) amine methacrylimide, and maleic anhydride.

The microspheres can be prepared by an aqueous suspension polymerization technique utilizing anionic emulsifiers in an amount greater than the critical micelle concentration, and without addition of protective colloids, finely divided organic solids, or the like. Critical micelle concentration is defined as that minimum emulsifier concentration necessary for the formation of micelles. This concentration is slightly different for various emulsifiers, with usable concentrations ranging from about $1.0 \times 10^{-4}$ to about 3.0 moles per liter. Non-ionic emulsifiers may be utilized so long as an anionic emulsifier is present and predominates.

Catalysts for effecting polymerization of the monomers are those which are normally suitable for free-radical polymerization of acrylate monomers and which are oil-soluble of very low solubility in water such as, for example, benzoyl peroxide. Catalyst concentration should be high enough to avoid possible agglomeration of the spheres yet should not be so high as to promote the formation of low molecular weight polymer, which does not exhibit all the desired properties. Concentrations of from about 0.15 to about 0.6 percent by weight, of the total suspension, and preferably about 0.25 to 0.45 weight percent, will generally provide a suitable polymer product.

If desired, the aqueous suspension of microspheres may be utilized immediately following polymerization, because the suspension is stable to agglomeration or coagulation under room temperature conditions. Alternatively, the suspension may be coagulated with methanol, saturated salt solutions, or the like, followed by washing and drying. These dried polymer spheres, with sufficient agitation, will readily suspend in a variety of common organic solvents, such as ethyl acetate, tetrahydrofuran, heptane, 2-butanone and other ketones, benzene cyclohexane, esters, isopropanol, and higher alcohols. Highly polar solvents such as water, methanol, and ethanol should be avoided once the spheres are dried, as the spheres will not form suspensions in such solvents.

Figure 2:
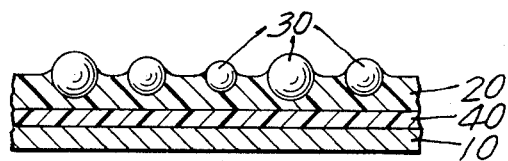
Figure 3:
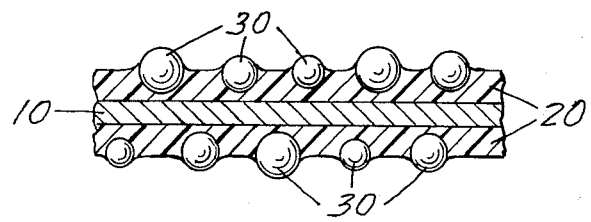

FIGS. 1, 2 and 3 represent cross-sections through the composite construction of the invention. It should be noted that the drawings are illustrative only, and proportional dimensions of components contained therein are not representative of actual dimensions.

In FIG. 1, substrate 10 has bonded to one surface thereof a binder material 20 having embedded therein adhesive microspheres 30, the spheres being effectively retained thereby.

The substrate or backing useful for the invention can in general be any material which is not so porous as to allow the binder material to permeate the backing and prevent a supporting anchoring film from being maintained. Exemplary substrates include films such as polyesters, cellulose acetate, and polyvinyl chloride, glass, wood, vinyl copolymers and urethane cast closed cell foams, and paper. Useful substrates also include bonded composites, such as paper bonded to foam, films bonded to foam or paper, etc.

In some instances it may be advantageous to employ an intermediate primer layer between the substrate and the binder layer. For example, if a particular binder resin will not wet out properly on a substrate, a primer layer can conveniently overcome this. In the case of an extremely porous substrate, such as soft paper, for example, a primer can conveniently fill the pores to provide a sufficiently impermeable surface for overcoating the binder-adhesive composition. In the case of substrates with an irregular surface, a primer may aid in providing a more smooth surface for the binder-adhesive composition. Generally, however, an intermediate primer layer is not necessary to provide sufficient durability to the composite article.

FIG. 2 is illustrative of the utilization of a primer layer 40 interposed between substrate 10 and binder matrix 20 having embedded therein the microsphere adhesive 30.

The binder compound utilized to anchor the spheres to prevent their removal from the adhesive surface should be compatible with the microspheres, i.e., it should neither chemically attack the polymer spheres nor act as a solvent for them. In other words, the anchoring binder should be inert toward the microspheres. Film-forming resins having a high degree of adhesion for the acrylate copolymer spheres generally are effective to anchor the spheres to a substrate. Relatively hard resins such as epoxies and nitrocellulose and relatively soft resins such as acrylates and vinyl ethers are examples of suitable film-forming anchoring binder resins.

It has been found that such apparently umpromising materials such as fluorochemicals, urethanes, silicones and even microcrystalline wax will also provide a satisfactory anchor for the microspheres. This surprising fact is believed to be the result of the socket effect provided by the binder resins as illustrated in FIGS. 1, 2, and 3. Each socket apparently acts like a mechanical closure physically restraining the microspheres within their individual sockets. There is probably also a vacuum effect tending to restrain the microspheres within each individual socket, although we do not wish to be bound by any particular theory.

The quantity of binder material should be such that the microspheres are effectively anchored to the substrate or backing but should not be so great as to cause complete submergence of the microsphere therein such that no microsphere surface area is available to be contacted by an object, such as for example a piece of paper, desired to be adhered to the adhesive microspheres. It has been determined that this concentration can range from approximately 0.15 part to about 2.5 parts by weight of resin to microsphere, with about 0.20 to 0.60 being preferred.

Quantity of binder will of course vary with the density of the binder, degree of binder adhesion for the microspheres, film-forming tendency of the binder, size of microspheres, etc.

Suitability of any particular binder material and its optimum concentration can be conveniently determined by utilizing a simple test apparatus which consists of two squeeze rolls. The top roll, which is 2½ inches in diameter and 5 inches long, is formed of threaded 70 Shore durometer rubber; the driven bottom roll, which is 3 inches in diameter and 5 inches long, is steel having a 1/16-inch thick vinyl foam covering. The test procedure consists of wrapping the roll with a test swatch of a substrate having bonded to the surface thereof a selected binder with acrylate microsphere adhesive protruding from the surface thereof. A standard material, such as adding machine tape, can be fed through the nip, whereupon each revolution of the sample-carrying top roll can be conveniently considered to be equivalent to a new application of paper to the sample. Nip pressure is the weight of the freely rotatable top roll, about 9 pounds.

When tested in this manner, the adding machine tape will typically adhere to and follow the sample. The tape can be manually removed from the sample so as to prevent interference with the sample contacting fresh tape at the nip. When this paper stops attempting to follow the top roll, the effectiveness of the adhesive system can be considered to be so minimal as to be inadequate. A counter attached to the shaft of the top roll can conveniently record the sample revolutions to afford a measure of durability of the binder system selected.

Where necessary, conventional primers can be conveniently utilized between the substrate and the film-forming binder layer. The art of priming substrates to allow wetting or bonding of a variety of coatings is well known. For example, U.S. Pat. Nos. 2,328,066 and 2,926,105 disclose primers for a cellophane substrate, U.S. Pat. No. 2,927,868 discloses primers for acetate films, and U.S. Pat. No. 2,897,960 discloses primers for polyvinyl chloride films.

In some instances it may be desirable to coat both surfaces of a sheet material with the binder-microsphere adhesive matrix. This double-coated sheet can be utilized, for example, to form a temporary bulletin board which itself is to be removable from a wall or similar structure without damage to the paint thereon. In a similar manner, a doublecoated transparent sheet such as polyester film can be temporarily applied to a window and used to attach replaceable signs, plaques, decorative objects, etc.

FIG. 3 illustrates a substrate 10 having bonded to both surfaces thereof a layer comprising binder 20 with microspheres 30 embedded therein.

Application of the binder-microsphere adhesive mixture to the substrate can be undertaken in any conventional manner. For example, the mixture may be coated to a desired thickness, using, e.g., a knife, a wire-wound bar, or a roto gravure roll. Alternatively, the mixture may be sprayed onto a substrate. Solution concentrations can vary depending on the mode of application. Generally, application concentrations of from about 2 to about 50 percent solids are acceptable.

The invention is further illustrated by the following examples, wherein all parts are by weight unless otherwise specified.

EXAMPLE 1

A 3-liter indented resin flask, fitted with a mechanical stirrer, was charged with 410 grams (90 mole percent) iso-octyl acrylate, 38 grams (10 mole percent) trimethylamine methacrylamide, 1,500 ml. deoxygenated distilled water, and 20 grams alkyl arylpolyethylene oxide sodium sulfonate (commercially available from the Rohm and Haas Company under the trade designation "Triton" X-200). The flask was purged with nitrogen, 1.5 gram benzoyl peroxide was added, and the mixture was heated to 66°C. under a nitrogen blanket.

At the end of the 20 hours, the suspension was cooled to 20°C and filtered through cheesecloth to remove agglomerates. A part of the suspension was coagulated and washed with methanol and redispersed in hexane and another portion dispersed in heptane. The discrete microspheres range in diameter from about 10 to about 150 microns.

A vinyl film and a 1-mil thick biaxially oriented polyethylene terephthalate film were spray coated with a 5 percent solids hexane dispersion of the microspheres. The coatings were dried at 150°F. for 1 hour and allowed to reach equilibrium at room temperature for 1 hour, whereupon a dry coating weight of approximately 7 grams per square yard was obtained. Utilizing an adhesion test station as aforementioned, a 3-inch × 8-inch sample of coated film was wrapped around the top roll. Conventional adding machine tape was fed through the nip, contacting the coated sample.

The microsphere-coated vinyl film was contacted 17 times by fresh adding machine tape (as determined by the number of revolutions of the top roll), whereupon adhesion of the tape to the sample was minimal. Similarly, the coated polyethylene terephthalate film was contacted 19 times whereupon minimal adhesion was noted.

The vinyl film and biaxially oriented polyethylene terephthalate film was first primed by spraying the surface with a crosslinked acrylic ester/acrylic acid copolymer (as disclosed in U.S. Pat. No. 3,578,622) followed by the microsphere application. The microsphere-coated primed vinyl film was contacted 50 times whereupon adhesive failure was noted. Similarly the primed polyethylene terephthalate film was contacted 63 times whereupon adhesive failure was noted.

EXAMPLE 2

To the aqueous microsphere suspension of Example 1 was added water and an acrylate/acid copolymer resin latex (disclosed in U.S. Reissue Pat. No. 24,906) to provide a ratio of about 0.37 part by weight of resin per part by weight of microsphere. The mixture contains approximately 22 percent solids.

The mixture was coated onto the vinyl and polyethylene terephthalate films of Example 1, utilizing a No. 50 wire-wound coating bar, and dried to a dry coating weight of 7.0 grams per square yard. When tested as per Example 1 for durability, the coated vinyl sample was contacted 588 times before minimal adhesion was obtained. Similarly, the coated polyethylene terephthalate film was contacted 265 times before failure.

When the films were initially primed as per Example 1, the vinyl and polyethylene terephthalate samples were contacted 567 and 537 times, respectively, before adhesion failure was noted.

EXAMPLE 3

To the heptane microsphere suspension of Example 1 was added a heptane dispersion of an acrylate/acid copolymer resin (as disclosed in U.S. Reissue Pat. No. 24,906) to provide a ratio of about 0.33 part by weight of resin per part by weight of microsphere.

EXAMPLE 4

A solution was prepared by mixing the following components:

| Parts | Compound |
|---|---|
| 1.37 | Epon 828 (tradename for an epoxy resin sold by the Shell Chemical Company) |
| 0.12 | dimethylamine triamine (a room temperature epoxy curative) |
| 18.51 | toluene |

To this solution was added 80 parts of a 5 percent solids heptane dispersion of the microspheres of Example 1, thereby providing about 0.37 part by weight of epoxy system per part by weight of microsphere.

This mixture was sprayed in a conventional spray booth onto a 1-mil thick biaxially oriented polyethylene terephthalate film. The film was dried and cured at 150°F. for 1 hour and left at room temperature overnight, providing a dry coating weight of 8.74 gram per square yard.

To a 1-inch × 8-inch sample of the film was applied common newsprint, utilizing a conventional 4½ lb. press roll to insure intimate contact. The sample was mounted in a conventional "Instron" tensile testing machine with the jaw speed set at 10 inches per minute so as to test the peel strength of the sample. With the newsprint and coated film pulled in opposite directions, a peel strength of 12 grams per inch width was noted.

The remainder of the coated film sample was contacted with fresh adding machine tape in the durability testing apparatus of Example 1, a total of 100 times (i.e., 100 revolutions of the upper roll). A 1-inch × 8-inch sample of the coated film is peel tested with newsprint as above whereupon a peel strength of 14 grams per inch width is noted.

EXAMPLE 5

A solution is prepared by mixing the following components:

| Parts | Compound |
| --- | --- |
| 2.0 | Nitrocellulose RS ½ Second (a 70 percent solids nitrocellulose in isopropanol, sold by Herculese Chemical Co.) |
| 48.0 | methyl ethyl ketone |

To this solution was added 50 parts of an 8 percent solids methyl ethyl ketone dispersion of the microspheres of Example 1, thereby providing about 0.35 parts by weight of nitrocellulose per part by weight of microsphere.

This mixture was sprayed in a conventional spray booth onto a 1-mil thick biaxially oriented polyethylene terephthalate film, which has been primed as per Example 1. The film was dried at 150°F. for 1 hour and left at room temperature overnight, providing a dry coating weight of 5.58 gram per square yard.

The sample was peel tested as per Example 4. Fresh sample had a paper peel strength of 60 grams per inch width. After contacting 100 times with fresh adding machine tape, the paper peel strength was 5 grams per inch width.

EXAMPLE 6

A solution is prepared as follows:

| Parts | Compound |
| --- | --- |
| 14.9 | 10 percent solids copolymer of a methacrylic ester of a fluoroaliphatic alcohol and octadecyl methacrylate as disclosed in U.S. Patent No. 2,803,615, in 1,1,1-trichloroethane |
| 35.1 | heptane |

To this solution was added 50 parts of an 8 percent solids heptane dispersion of the microspheres of Example 1, thereby providing about 0.37 part by weight of fluorochemical per part by weight of microsphere.

The mixture was sprayed onto primed film as per Example 5, whereupon a dry coating weight of 5.58 gram per square yard was obtained.

When tested as per Example 4, 13 grams per inch width and 8 grams per inch width were obtained from fresh sample and sample contacted 100 times with adding machine tape, respectively.

EXAMPLE 7

To 29.8 parts of a 5 percent solids toluene solution of a urethane (polyvinyl octadecyl carbamate as disclosed in U.S. Pat. No. 2,532,011) was added 80 parts of a 5 percent solids toluene dispersion of the microspheres of Example 1, thereby providing about 0.37 part by weight of urethane per part by weight of microsphere.

The mixture was sprayed onto primed film as per Example 5, whereupon a dry coating weight of 5.58 gram per square yard was obtained.

When tested per Example 4, 10 grams per inch width and 8 grams per inch width were obtained from fresh sample and sample contacted 100 times with adding machine tape, respectively.

EXAMPLE 8

A dispersion was prepared by mixing

| Parts | Compound |
| --- | --- |
| 19.3 | Rhoplex B-15 (tradename for a 46 percent solids in water acrylate resin sold by the Rohm and Haas Co.) |
| 37.0 | water |

To this dispersion was added 43.7 parts of a 50 percent solids aqueous microsphere suspension of Example 1, thereby providing about 0.41 part by weight acrylate resin per part by weight of microsphere.

The mixture was coated with a No. 50 wire wound bar onto a 1-mil biaxially oriented polyethylene terephthalate film, dried at 150°F. for 1 hour, left at room temperature overnight, providing a dry coating weight of 6.76 gram per square yard.

When tested as per Example 4, 50 grams per inch width and 12 grams per inch width were obtained from fresh sample and sample contacted 100 times with adding machine tape, respectively

EXAMPLE 9

A dispersion is prepared by mixing

| Parts | Compound |
| --- | --- |
| 16.2 | Gantrez M154 (tradename for a 50 percent solids in water polyvinyl methyl ether dispersion sold by the General Analine and Film Corp.) |
| 40.1 | water |

To this dispersion is added 43.7 parts of the 50 percent solids aqueous microsphere suspension of Example 1, thereby providing about 0.41 part by weight of acrylate resin per part by weight of microsphere.

The mixture was coated with a No. 50 wire wound bar onto a 1-mil biaxially oriented polyethylene terephthalate film, dried at 150°F. for 1 hour, left at room temperature overnight, providing a dry coating weight of 6.76 gram per square yard.

When tested as per Example 4, 66 grams per inch width and 44 grams per inch width were obtained from fresh sample and a sample contacted 100 times with adding machine tape, respectively.

EXAMPLE 10

A dispersion is prepared by mixing

| Parts | Compound |
|---|---|
| 4.26 | Syloff 23 (tradename for a 30 percent solids silicone rubber in xylene sold by the Dow Chemical Corp.) |
| 0.128 | Syloff 297 (tradename for an adhesion promotor and pot life extender sold by the Dow Chemical Corp.) |
| 0.1025 | XC-4-2117 (tradename for a 30 percent solids accellerator in xylene sold by the Dow Chemical Corp. |
| 0.154 | XY-176 (tradename for a silicone rubber curing agent sold by the Dow Chemical Corp.) |
| 50.0 | 8 percent solids microsphere (of Example 1) dispersion in heptane |
| 45.36 | heptane |

The mixture was coated with a No. 50 wire-wound bar onto a 1 mil biaxially oriented polyethylene terephthalate film which had been primed as per Example 1, dried and cured at 150°F. for 1 hour, and left overnight at room temperature, whereby the dry coating weight was 3.59 grams per square yard.

When tested as per Example 4, 9 grams per inch width and 5 grams per inch width were obtained from fresh sample and sample contacted 100 times with adding machine tape, respectively.

EXAMPLE 11

A composition is prepared by mixing the following:

| Parts | Compound |
|---|---|
| 1.49 | Petrolite C 1035 (tradename for a microcrystalline wax sold by the Petrolite Corp.) |
| 48.51 | heptane |

To this mixture was added 50 parts of an 8 percent solids heptane dispersion of the microspheres of Example 1, thereby providing about 0.37 parts by weight of wax per part by weight of microsphere.

The mixture was sprayed and dried onto polyethylene terephthalate film as per Example 5, providing a dry coating weight of 6.21 gram per square yard.

When tested as per Example 4, 35 grams per inch width and 30 grams per inch width were obtained from fresh sample and sample contacted 100 times with adding machine tape, respectively.

What is claimed is:

1. A repeatedly usable pressure-sensitive sheet material comprising a substrate having bonded thereto a binder material, said binder having partially embedded in and protruding from its exposed surface inherently tacky elastomeric copolymer microspheres consisting essentially of
   a. about 90 to about 99.5 percent by weight of one or more oleophilic, water-emulsifiable alkyl acrylate esters, at least one of said esters being selected from the group consisting of iso-octyl acrylate, 4-methyl-2-pentyl acrylate, 2-methylbutyl acrylate, and sec-butyl acrylate and correspondingly
   b. about 10 to about 0.5 percent by weight of one or more monomers selected from the group consisting of trimethylamine methacrylimide, trimethylamine p-vinyl benzimide, ammomium acrylate, sodium acrylate, N,N-dimethyl-N-($\beta$-methacryloxyethyl) ammonium propionate betaine, 1,1-dimethyl-1-(2-hydroxypropyl) amine methacrylimide, 4,4,9-trimethyl-4-azonia-7-oxo-8-oxa-9-decene-1-sulphonate, 1,1-dimethyl-1-(2,3-dihydroxypropyl) amine methacrylimide, and maleic anhydride.

2. The pressure-sensitive sheet material of claim 1 wherein said substrate is a polyvinyl chloride film.

3. The pressure-sensitive sheet material of claim 1 wherein said substrate is a closed-cell foam.

4. The pressure-sensitive sheet material of claim 1 wherein said substrate is paper.

5. The pressure-sensitive sheet material of claim 1 further comprising an intermediate primer layer between said substrate and said binder.

6. The pressure-sensitive sheet material of claim 1 wherein said binder is a film-forming acrylate resin.

7. The pressure-sensitive sheet material of claim 1 wherein said binder is a film-forming polyvinyl methyl ether resin.

8. The pressure-sensitive sheet material of claim 1 wherein said substrate is a polyvinyl chloride film bonded to a closed-cell foam.

9. The pressure-sensitive sheet material of claim 1 wherein said substrate is paper bonded to a closed-cell foam.

* * * * *